(12) United States Patent
Reuter et al.

(10) Patent No.: US 6,182,799 B1
(45) Date of Patent: Feb. 6, 2001

(54) FIXED-YOKE BRAKE WITH APPROPRIATE BRAKE PADS

(75) Inventors: Manfred Reuter, Weilmunster; Hans-Dieter Leidecker, Frankfurt; Rolf Weiler, Eppstein, all of (DE)

(73) Assignee: ITT Manufacturing Enterprises, Inc., Wilmington, DE (US)

( * ) Notice: Under 35 U.S.C. 154(b), the term of this patent shall be extended for 0 days.

(21) Appl. No.: 09/142,365

(22) PCT Filed: Feb. 19, 1997

(86) PCT No.: PCT/EP97/00785

§ 371 Date: Feb. 8, 1999

§ 102(e) Date: Feb. 8, 1999

(87) PCT Pub. No.: WO97/31195

PCT Pub. Date: Aug. 28, 1997

(30) Foreign Application Priority Data

Feb. 24, 1996 (DE) .............................................. 196 07 056

(51) Int. Cl.[7] .................................................... F16D 55/00
(52) U.S. Cl. ........................................ 188/71.1; 188/73.37
(58) Field of Search ............................. 188/73.31, 73.32, 188/73.33, 73.34, 73.1, 71.1, 73.47, 73.36, 73.35, 73.37, 73.38, 73.44, 73.45, 250 E, 257, 258, 255, 256

(56) References Cited

U.S. PATENT DOCUMENTS 5,472,068 * 12/1995 Weiler et al. ...................... 188/73.44
5,842,546 * 12/1998 Biswas ............................... 188/73.37

FOREIGN PATENT DOCUMENTS

| 1915350 | 3/1965 | (DE) . |
|---|---|---|
| 1211500 | 2/1966 | (DE) . |
| 1425391 | 2/1969 | (DE) . |
| 3333670 | 4/1985 | (DE) . |
| 3736126 | 5/1989 | (DE) . |
| 4020668 | 1/1992 | (DE) . |
| 4036063 | 5/1992 | (DE) . |
| 4036401 | 5/1992 | (DE) . |
| 4131130 | 3/1993 | (DE) . |
| 4418955 | 7/1995 | (DE) . |
| 4416815 | 11/1995 | (DE) . |
| 4435669 | 4/1996 | (DE) . |
| 027714 | 4/1981 | (EP) . |
| 163030 | 12/1985 | (EP) . |
| 380769 | 8/1990 | (EP) . |
| 705993 | 4/1996 | (EP) . |
| 1340988 | 9/1962 | (FR) . |
| 1176922 | 1/1970 | (GB) . |
| 1310843 | 3/1973 | (GB) . |
| 1414915 | 11/1975 | (GB) . |

OTHER PUBLICATIONS

Japanese Patent Abstract Publication No. 57163736.
Search Report of the German Patent Office for Application 196 35 838.8.
Japanese Abstract 60–151432(A) dated Sep. 8, 1985.

* cited by examiner

Primary Examiner—Christopher P. Schwartz
Assistant Examiner—Melanie Talavera
(74) Attorney, Agent, or Firm—Rader, Fishman & Grauer PLLC

(57) ABSTRACT

A fixed caliper brake wherein, the material rigidity is reduced at appropriate locations on the brake housing and of the brake linings in order to create partial systems at the brake which can vibrate in a damped manner. With respect to weight, these steps are undertaken extensively in a neutral manner and they reduce the vibrations of the entire brake assembly resulting in a reduction in braking noises.

28 Claims, 4 Drawing Sheets

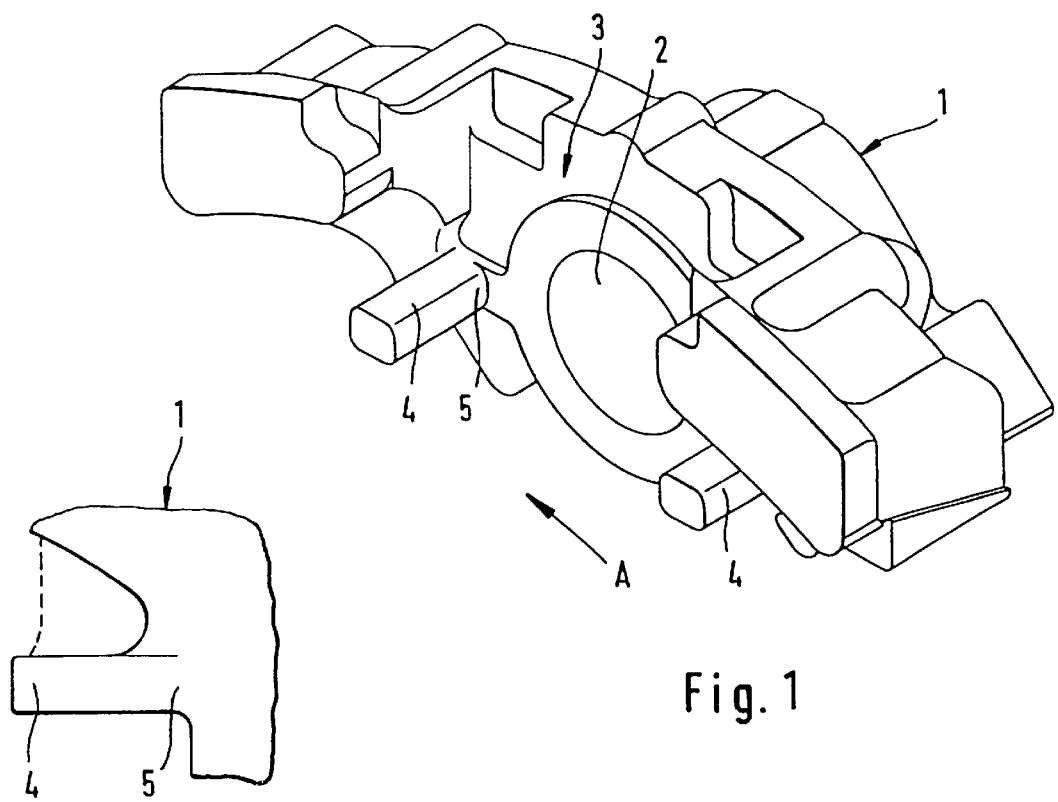
Fig. 1
Fig. 2
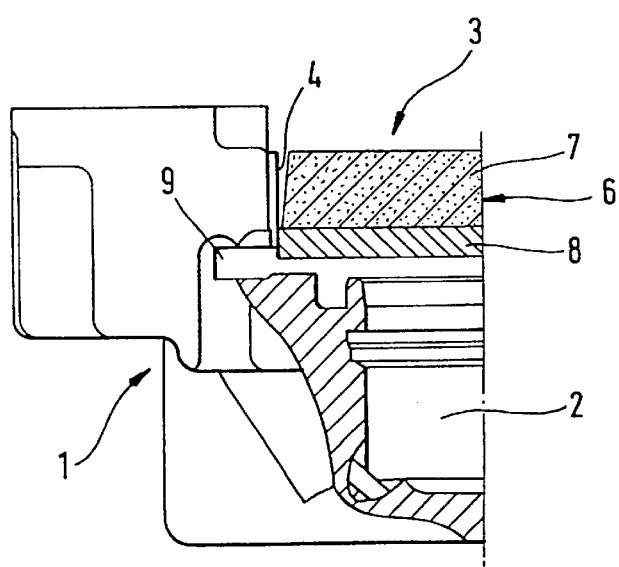
Fig. 3

FIXED-YOKE BRAKE WITH APPROPRIATE BRAKE PADS

TECHNICAL FIELD

The invention relates to a caliper, as well as accompanying brake linings.

BACKGROUND OF THE INVENTION

A fixed caliper brake of this type is disclosed in DE 41 31 130 A1 (offenlegungsschrift). With this fixed caliper brake, the two brake linings are arranged on both sides of the brake disk inside a shaft within the brake housing in such a way that they can be removed radially and, with the aid of hydraulic operating devices present on both sides of the brake disk, can be pressed against the brake disk. The brake linings are axially guided by means of a holding pin and, for the transfer of the peripheral forces during the braking process, they rest tangentially on axially extending, protruding lining supports inside the housing. The disadvantage with such brakes lies in that they produce a considerable amount of noise during braking. This noise production is due to the generation of vibrations in the entire brake arrangement due to fluctuations in the frictional force between the brake lining and the brake disk. In particular, the compact and rigid construction of fixed caliper brakes enhances the transfer of vibrations and may not be able to sufficiently counteract the noise production. Consequently, in the past, steps have been taken for counteracting brake noises of various types. For example, damping layers or metal sheets are frequently applied to the reverse side of the brake linings which, however, incurs additional costs.

In EP 0 163 030 B1, additional brake linings are disclosed which may be used, for example, in a fixed caliper brake of this type and which have through-holes in the lining's backing plate which are filled with the friction lining substance. However, these through-holes do not so much serve for the reduction of noise but, rather, for preventing the friction lining from being cut by the backing plate.

Furthermore, from the documents DE 37 36 126 C2 and DE 40 36 401 A1, antivibration substances are known which are mounted at the brake housing, influence the vibratory behavior of the entire brake arrangement and are used to reduce the generation of noise. However, here, it is necessary to tolerate the resulting increase in the overall dimension of the brake.

The objective of the invention lies in a reduction of the noise development in connection with fixed caliper brakes by means of specific steps taken at the brake housing as well as at the brake lining, which influence the vibratory behavior of the entire brake arrangement without the need for further structural components or the addition of more weight to the brake.

In principle, the invention consists in that the rigidity of the material is specifically reduced at suitable locations at the brake housing or also at the brake linings in order to create partial systems at the brake which can vibrate in a damped manner, reduce the total vibration of the fixed caliper brake and check the noise development.

Preferably, the tangential support of the brake linings is constructed inside the brake housing in such a way as to permit vibrations since these brake linings are directly affected by the generation of vibrations. For this purpose, one embodiment of the invention provides an axially extending peg as a lining support which can vibrate radially as well as tangentially.

In another embodiment of the fixed caliper brake, the axially extending support of the lining has on the side facing the hydraulic operating device a radially extending groove, which reduces the rigidity of the housing in the axial direction.

In addition to the steps taken at the brake housing, above all, the rigidity of the lining's backing plate is reduced by the provision of through-holes. These through-holes are located near or directly at the tangential front face of the backing plate and are filled either with a friction lining substance or with another material with good damping properties. The remaining radial flanges of the lining's backing plate, together with the filled-in through-holes, form tangentially effective, damped vibration systems which, during braking, transfer the generated vibrations in greatly damped form.

In addition to the friction lining substance, as a filler material for the through-holes, preferably inlaid synthetic parts are provided which, in one variation, are introduced directly at the tangential front surface of the backing plate of the lining into the respective through-holes, i.e., precisely at the point that is resting against the lining support while forming an integral part of the housing. This results in the most considerable damping effects.

In a further development of the fixed caliper brake, at least one vibration damper is provided at the brake housing, forming a one-piece connection with the brake housing. This vibration damper is able to vibrate with respect to the brake housing and, in this way, is capable of reducing the total vibration of the fixed caliper brake. The connection of the vibration damper takes place directly during casting of the brake housing with the aid of a flange having a small cross-section or being cast on in crude form followed by shaping of the cast housing through a cutting process.

BRIEF DESCRIPTION OF THE DRAWINGS

FIG. 1 shows a front view of a housing part of a fixed caliper brake;

FIG. 2 shows a partial view of the lining support of the fixed caliper brake in FIG. 1 from the direction A;

FIG. 3 shows a partial cut of a plan view of a housing part of a fixed caliper brake;

DETAILED DESCRIPTION OF THE PREFERRED EMBODIMENTS

Figure 4:
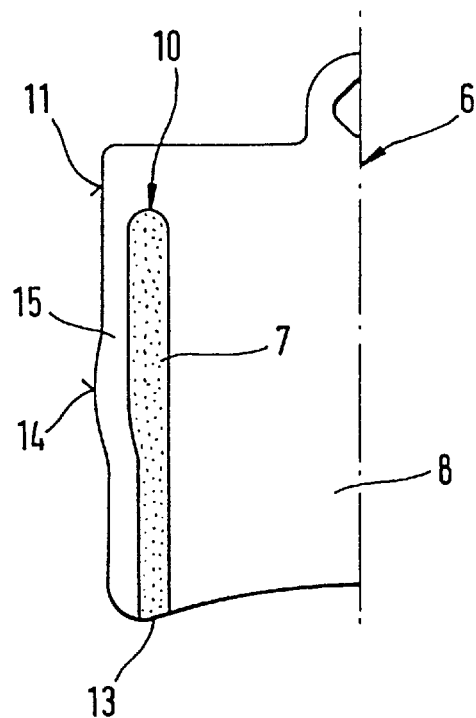
FIG. 4 shows a partial view of a brake lining with an elongated through-hole and a lateral opening of the through-hole towards the edge of the backing plate.

In FIG. 1, a brake housing part (1) of a fixed caliper brake is shown. Such a brake housing part (1), arranged on both sides of the brake disk, not shown, contains a hydraulic operating device (2) which is capable of pressing a brake lining, also not shown, against the brake disk. For this purpose, the brake linings are accommodated in a shaft (3) inside the brake housing which shaft (3) radially opens toward the outside. In order to accommodate the peripheral forces during a braking process, the linings are supported by axially extending, peg-like lining arrangements (4). Essentially, these lining arrangements (4) are connected only to the end (5) by being cast onto the brake housing, facing away from the brake disk inside the radially open shaft (3). By means of this arrangement, they can vibrate radially as well as tangentially. The vibrations resulting from fluctuations in the frictional force and transferred from the brake linings via the lining arrangements (4) onto the brake housing (1), are reduced as a result of a natural material damping of the vibrating lining arrangements (4). Thus, the peg-like lining arrangements (4) represent independently vibrating partial systems which reduce the vibration of the entire fixed caliper brake arrangement, thereby preventing the occurrence of brake noises.

FIG. 2 shows a partial view of a lining arrangement (4) of the brake housing part (1) from FIG. 1 from the direction of view (A). It clearly shows the reduction in material rigidity of the lining arrangement (4) as compared to lining supports known so far which are connected across nearly their entire length to the brake housing (broken line in FIG. 2). The reduction in the material rigidity at the lining arrangement (4) makes it possible for the latter, as a partial system of the fixed caliper brake, to carry out independent vibrations which are transferred merely to a small degree to the fixed caliper brake housing and are additionally damped due to the material damping properties of the material arrangement (4).

In FIG. 3, an example of the fixed caliper brake with brake lining (6) is shown in a partially cut plan view. The brake lining (6), consisting of the friction lining (7) and the lining's backing plate (8), is supported by the lining arrangement (4), tangentially bordering the shaft (3) which opens radially toward the outside. At that end (5) of the axially extending lining arrangement (4) which is facing the hydraulic operating device (2), a radially extending groove (9) is formed. Preferably, this groove (9) is molded on directly at the time of the casting of the housing (1); however, it can also be shaped by means of a cutting process. The groove (9) effects a reduced rigidity of the brake housing and thus permits a vibration of the lining arrangement (4) in the axial direction. Furthermore, the groove (9) weakens the transfer of vibrations during the braking process from the brake lining (6) via the lining arrangement (4) onto the brake housing (1).

Figure 5:
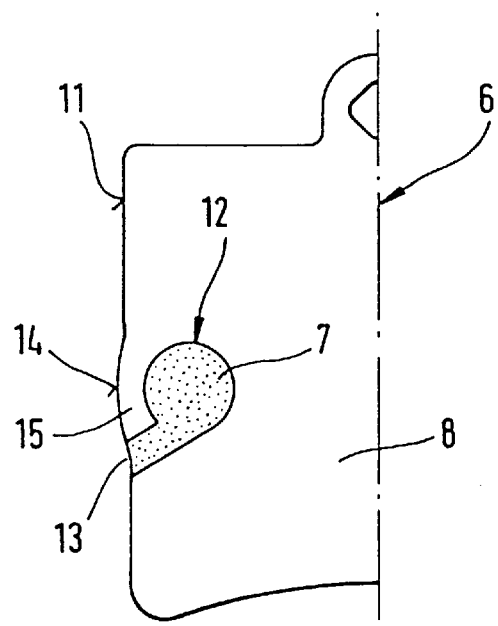
FIG. 5 shows a partial view of a brake lining with a round through-hole and a side opening of the through-hole toward the edge of the backing plate.
Figure 6:
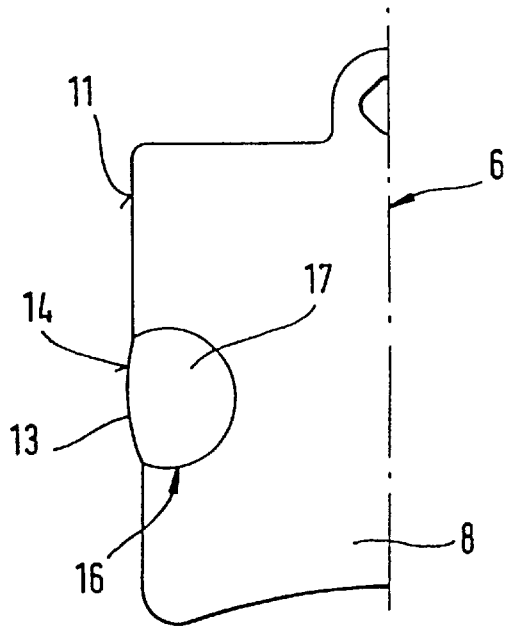
FIG. 6 shows a partial view of a brake lining with a through-hole directly at the tangential front surface of the lining's backing plate.

In addition to the steps taken at the caliper for the purpose of achieving a reduction in braking noises, FIGS. 4–8 show examples for brake linings (6) for fixed caliper brakes which have been produced in a variety of ways. In FIGS. 4–6, respectively, only half of a brake lining (6) is shown because of the mirror symmetry of the entire brake lining. All lining types shown have a through-hole in their lining's backing plate (8) near the tangential front faces (11)

In the case of the first two embodiments in accordance with FIGS. 4 and 5, the through-holes (10, 12), respectively, have an opening (13) toward the edge of the lining's backing [reverse] plate and are filled with friction lining substance (7). The radial expansion of the through-holes (10, 11) extends at least across the area of the tangentially protruding contact surfaces (14) of the lining's backing plate (8) by way of which the brake lining (6) is supported at the brake housing.

In FIG. 4, the through-hole is in the form of an elongated hole (10), extending radially across nearly the entire length of the backing plate of the brake and is provided with an opening (13) toward the radially enclosed edge of the backing plate. Hence, there remains at the tangential end of the lining's backing plate a thin flange (15) which can vibrate in the tangential direction and functions in the manner of a spring element. The friction lining substance (7) filling the oblong hole (10), in connection with the tangentially vibrating flange (15) of the lining's backing plate (8), functions like a damping element and reduces the vibration which is generated by the braking action.

In FIG. 5, the brake lining (6) has in its backing plate (8) a round through-hole (12) at the height of the tangential contact surface (14) of the brake lining with an opening (13) toward the tangential edge of the backing plate. Also here, the flange (15) and the lining substance (7) serve as a filling for the through-hole like a damped vibration system which is to use up a portion of the vibration energy in order to cause the entire brake caliper to vibrate less strongly.

FIG. 6 shows a brake lining with a through-hole (16) directly at the tangential edge of the backing plate. Here, the filling of the through-hole (16), consisting of the inserted synthetic part (17), directly forms the tangentially protruding contact surface (14) of the brake lining at the lining support rigidly mounted on the housing. The synthetic part (17), which naturally may also consist of another material with good damping properties has in particular a damping function with respect to the generation of vibrations during the braking process. In the case of the remaining embodiments of the linings, as cited and having through-holes which are filled with lining substance, other filling materials having good damping properties, such as a synthetic material, may also be used in an analogous manner.

Figure 7:
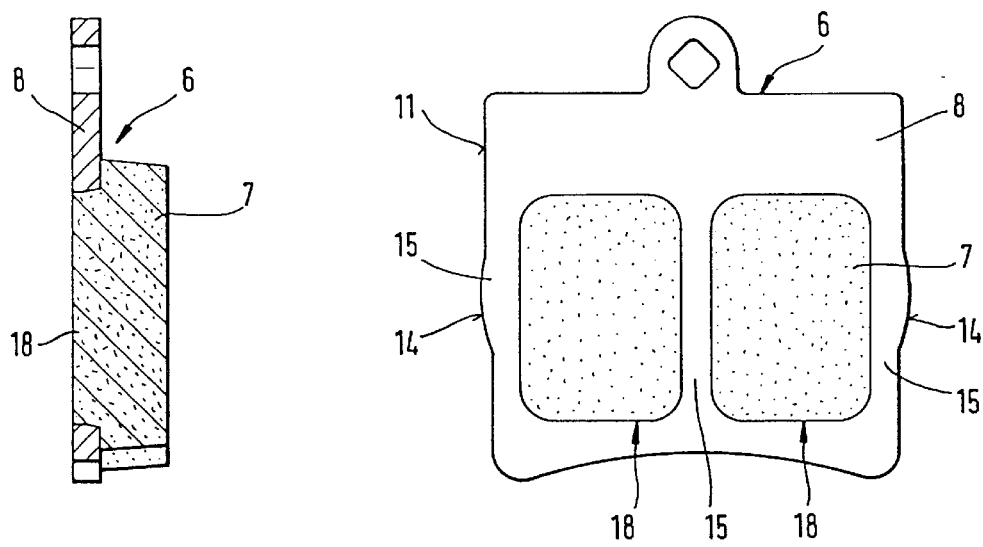
FIG. 7 shows two views of a brake lining with rectangular through-holes and a frame-like backing plate of the brake lining.

FIG. 7 shows two views of a brake lining having rectangular through-holes (18) and filled with friction lining substance (7), which are surrounded by the lining's backing plate (8) in the form of a closed frame. The three radially extending flanges (15) of the backing [reverse] plate can vibrate in the manner of springlike elements in the tangential direction. Their vibration, which is caused by the braking action, is damped to a high degree by means of the filling (7) inside the large through-holes (18) and thus prevents the creation of braking noises.

Figure 8:
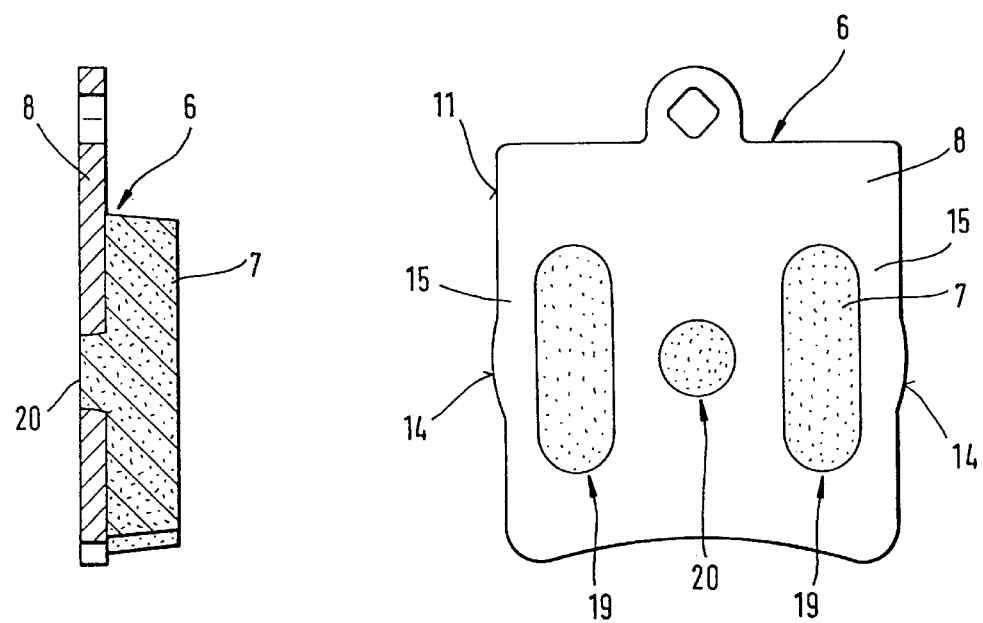
FIG. 8 shows two views of a brake lining with two slot-like through-holes, a round through-hole and a frame-like backing plate of the lining.

In FIG. 8, two views of a brake lining with three through-holes (19, 20) are shown, all of which are filled with friction lining substance (7). Two through-holes are formed near the tangential front surface (11) of the backing plate as radially extending oblong holes (19), while the third through-hole (20) has a round contour approximately in the center of the backing [reverse] plate. This embodiment with three through-holes (19, 20) increases the number of the radially extending flanges (15) of the backing plate and thereby also the number of the tangentially springlike elements which has an advantageous effect on the vibration damping behavior of the brake lining.

In a further development of the invention, the brake linings mentioned here are provided on the back of the backing plate with an additional damping plate, not shown, made of sheet metal, for example. This has the advantage that the filling material of the through-holes remains in the through-holes even in the presence of signs of disintegration due to great wear and that it continues to fulfill its vibration-damping function.

Figure 9:
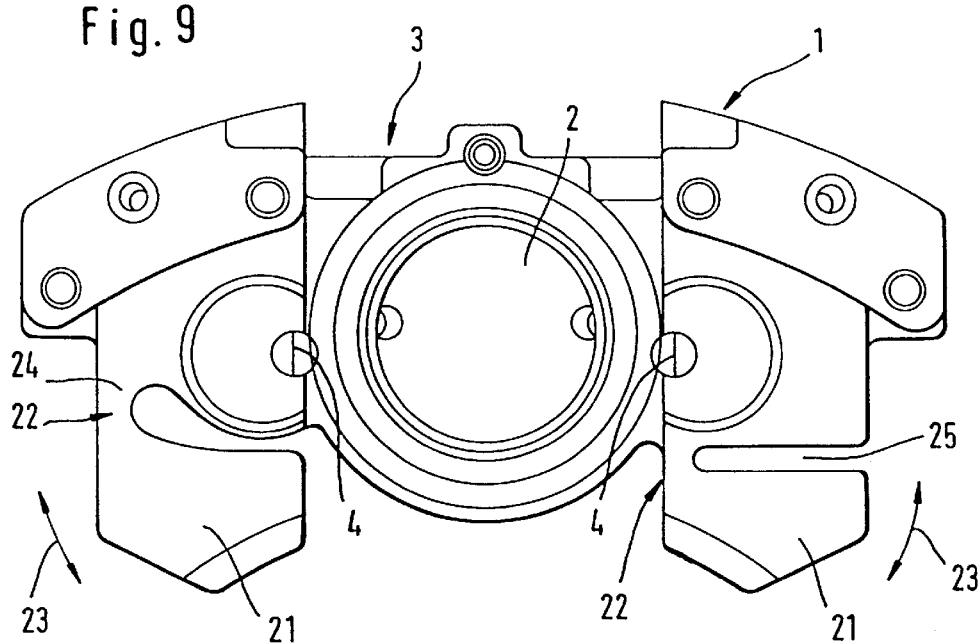
FIG. 9 shows a view from inside a brake housing part with integrated vibration dampers.
Figure 10:
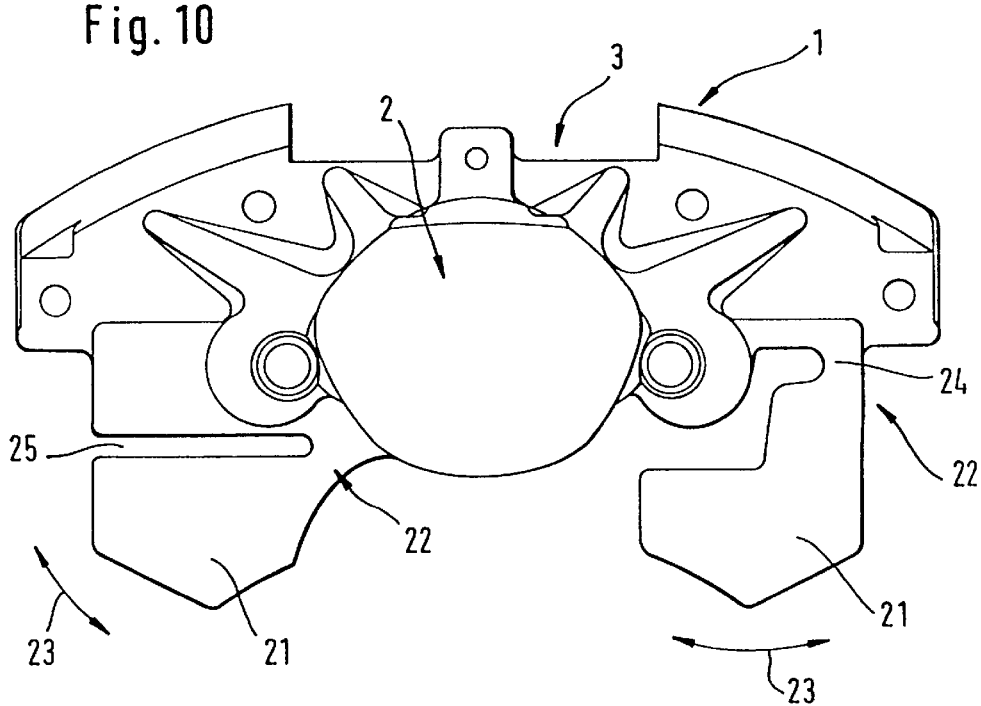
FIG. 10 shows a view from the outside a brake housing part with integrated vibration dampers.

In FIGS. 9 and 10, brake housings (1) of fixed caliper brakes can be seen which incorporate integrated vibration dampers (21). The vibration dampers (21), respectively, are attached in one piece at the brake housing (1) via a connection segment (22) with a small material cross section. Due to the small material cross section of the connection segment (22) and the reduced material rigidity of each connection segment (22) resulting therefrom, the vibration dampers (21) are capable of vibrating with respect to the brake housing (1). In contrast to known brakes with rigid added substances, in this case—due to the integrated vibration dampers (21), not only the inherent frequency of the entire fixed caliper brake is influenced, but additionally a portion of the vibration energy of the entire system is used up directly by means of the vibration dampers (21) vibrating during the operation of the brake. In this way, it is possible to reduce the vibration of the entire brake assembly and the production of brake noises is prevented.

Individually, the direction (23) of vibration of the vibration dampers (21) can be selected more or less freely due to the construction of the connection segments (22) and the location of the connection to the brake housing. In practice, the vibration dampers (21) are molded on during casting of the brake housing (1). At that time, ideally, the construction of the connection segment (22) as a thin flange (24) is provided directly at the time of casting and requires no additional cutting step. Optionally, however, the vibration damper (21) can be cast onto the brake housing (1) in unshaped form and the connection segment (22) with its small cross section may then be produced in a subsequent cutting process. For this purpose, a removal of material takes place wherein at the connection segment (22), between the vibration damper (22) and the brake housing (1), a notch (25) or a groove is applied and thereby the rigidity of the material of the connection segment (22) is definitely reduced. An elastic connection segment (22) is created which allows the vibration damper (21) to vibrate with respect to the brake housing.

The arrangement of the individual vibration dampers (21) in FIGS. 9 and 10 in the lower area of the brake housing (1) or near the radially open shaft (3) serves merely as an example. Naturally, such integrated vibration dampers (21) can also be provided elsewhere on the brake housing (1). For this purpose, first of all, those locations of the brake housing (1) are selected at which the generation of vibrations or the vibration amplitude without vibration dampers is particularly high. At these locations, through the use of integrated vibration dampers, the greatest reduction of the vibration of the entire brake assembly can be achieved.

Naturally, the use of such vibration dampers is not limited to the type of fixed caliper brake mentioned here. Without doubt, there are applications in connection with all brake housings or brake parts which are produced by casting methods and wherein a damping of vibrations is desirable (for example, brake holders, floating calipers, frame calipers, etc.).

What is claimed is:

1. Fixed caliper brake comprising:
a brake housing adapted to extend across a brake disk,
two brake linings arranged in a shaft of the brake housing which opens radially toward the outside and wherein the brake linings include a friction lining and the lining's backing plate, wherein the brake linings can respectively be pressed directly against the brake disk by means of a hydraulic operating device, wherein the brake housings have protrusions which extend in axial direction and border on the shaft in peripheral direction and serve as a lining support in peripheral direction, wherein the reduction of brake noises at the brake housing or at the brake linings, is achieved by reducing the rigidity of the material used to fabricate the brake housing or the brake linings is reduced in order to produce partial systems which vibrate in damped form at the fixed caliper brake wherein the lining support is formed by means of two peglike lining arrangements extending in the axial direction and essentially connected to the brake housing only in the area of the hydraulic operating device and in that they can vibrate in the tangential as well as the radial direction.

2. Fixed caliper brake, in accordance with claim 1, wherein the axially extending lining arrangements, for the purpose of supporting the lining, on the side facing the hydraulic operating device, have a groove extending in the radial direction.

3. Brake lining, particularly for use in a fixed caliper brake in accordance with claim 1, wherein the lining's backing plate has near its tangential front face a first through-hole which is filled with a material having good damping properties.

4. Brake lining, in accordance with claim 3, wherein the first through-hole is filled with friction lining substance.

5. Brake lining, in accordance with claim 3, wherein the first through-hole is filled with a synthetic material.

6. Brake lining, in accordance with claim 3, wherein the first through-hole has an opening toward the lateral edge of the lining's backing plate.

7. Brake lining, in accordance with claim 6, wherein the opening is situated at the location of the tangential front surface of the lining's backing plate which rests against the lining support inside the brake housing.

8. Brake lining, in accordance with claim 3, wherein a second through-hole is formed on both sides near the tangential front surface of the lining's backing plate, wherein the second through-hole is oblong and extends in a radial direction.

9. Brake lining, in accordance with claim 8, further including a third through-hole arranged at the height of the plane of symmetry of the lining's backing plate.

10. Fixed caliper brake, in accordance with claim 1, wherein at least one vibration damper is arranged which is connected with the brake housing in one piece and has reduced material rigidity, wherein the vibration damper can vibrate with respect to the brake housing.

11. Fixed caliper brake, in accordance with claim 10, wherein the vibration damper is integrally cast onto the brake housing.

12. Fixed caliper brake, in accordance with claim 10, wherein the cross section of the connection segment, between the brake housing and the vibration damper, is reduced.

13. Fixed caliper brake, in accordance with one of claim 10, wherein the vibration damper is connected to the brake housing by way of a flange which can be elastically deformed.

14. Fixed caliper brake, in accordance with claim 12, wherein the reduced cross section between the brake housing and the vibration damper is obtained by shaping the brake housing by means of a cutting process.

15. Fixed caliper brake comprising:
a brake housing adapted to extend across a brake disk,
two brake linings arranged in a shaft of the brake housing which opens radially toward the outside and wherein the brake linings include a friction lining and the lining's backing plate, wherein the brake linings can respectively be pressed directly against the brake disk by means of a hydraulic operating device, wherein the brake housings have protrusions which extend in axial direction and border on the shaft in peripheral direction and serve as a lining support in peripheral direction, wherein the reduction of brake noises at the brake housing or at the brake linings, is achieved by reducing the rigidity of the material used to fabricate the brake housing or the brake linings is reduced in order to produce partial systems which vibrate in damped form at the fixed caliper brake, wherein the vibration damper is integrally cast onto the brake housing.

16. Fixed caliper brake, in accordance with claim 15, wherein the lining support is formed by means of two peglike lining arrangements extending in the axial direction and essentially connected to the brake housing only in the area of the hydraulic operating device and in that they can vibrate in the tangential as well as the radial direction.

17. Fixed caliper brake, in accordance with claim 15, wherein the axially extending lining arrangements, for the purpose of supporting the lining, on the side facing the hydraulic operating device, have a groove extending in the radial direction.

18. Brake lining, particularly for use in a fixed caliper brake in accordance with claim 15, wherein the lining's backing plate has near its tangential front face a first through-hole which is filled with a material having good damping properties.

19. Brake lining, in accordance with claim 18, wherein the first through-hole is filled with friction lining substance.

20. Brake lining, in accordance with claim 18, wherein the first through-hole is filled with a synthetic material.

21. Brake lining, in accordance with claim 18, wherein the first through-hole has an opening toward the lateral edge of the lining's backing plate.

22. Brake lining, in accordance with claim 21, wherein the opening is situated at that location of the tangential front surface of the lining's backing plate which rests against the lining support inside the brake housing.

23. Brake lining, in accordance with claim 18, wherein a second through-hole is formed on both sides near the tangential front surface of the lining's backing plate, wherein the second through-hole is oblong and extends in a radial direction.

24. Brake lining, in accordance with claim 23, further including a third through-hole is arranged at the height of the plane of symmetry of the lining's backing plate.

25. Fixed caliper brake, in accordance with claim 15, wherein at least one vibration damper is arranged which is connected with the brake housing in one piece and has reduced material rigidity, wherein the vibration damper can vibrate with respect to the brake housing.

26. Fixed caliper brake, in accordance with claim 25, wherein the cross section of the connection segment, between the brake housing and the vibration damper, is reduced.

27. Fixed caliper brake, in accordance with one of claim 25, wherein the vibration damper is connected to the brake housing by way of a flange which can be elastically deformed.

28. Fixed caliper brake, in accordance with claim 26, wherein the reduced cross section between the brake housing and the vibration damper is obtained by shaping the brake housing by means of a cutting process.

* * * * *

UNITED STATES PATENT AND TRADEMARK OFFICE
CERTIFICATE OF CORRECTION

PATENT NO.    : 6,182,799 B1
DATED         : February 6, 2001
INVENTOR(S)   : Manfred Reuter, Hans-Dieter Leidecker and Rolf Weiler It is certified that error appears in the above-identified patent and that said Letters Patent is hereby corrected as shown below:

<u>Column 6,</u>
Line 30, replace "at the location" with -- at that location --.

Signed and Sealed this

Fourth Day of June, 2002

Attest:

Attesting Officer

JAMES E. ROGAN
Director of the United States Patent and Trademark Office